(12) United States Patent
Berger

(10) Patent No.: US 6,701,956 B1
(45) Date of Patent: Mar. 9, 2004

(54) WATER CONTROL DEVICE

(75) Inventor: Benjamin Berger, Haifa (IL)

(73) Assignee: Bermad, Kibbutz Evron (IL)

( * ) Notice: Subject to any disclaimer, the term of this patent is extended or adjusted under 35 U.S.C. 154(b) by 0 days.

(21) Appl. No.: 09/868,161

(22) PCT Filed: Oct. 20, 1999

(86) PCT No.: PCT/IL99/00548

§ 371 (c)(1),
(2), (4) Date: Sep. 5, 2001

(87) PCT Pub. No.: WO00/36233

PCT Pub. Date: Jun. 22, 2000

(30) Foreign Application Priority Data

Dec. 13, 1998 (IL) .................................. 127539

(51) Int. Cl.⁷ ............................. G01F 15/18; E03B 7/07
(52) U.S. Cl. ........................................ 137/551; 73/201
(58) Field of Search ........................... 137/551, 315.06; 73/198, 199, 201; 222/63, 71

(56) References Cited

U.S. PATENT DOCUMENTS

| | | | | |
|---|---|---|---|---|
| 691,904 A | * | 1/1902 | Hallbergh | ..................... 73/198 |
| 910,514 A | * | 1/1909 | Dilts | ........................... 73/201 |
| 4,133,021 A | * | 1/1979 | King et al. | .................... 73/201 |
| 6,178,816 B1 | * | 1/2001 | Katzman et al. | .............. 73/201 |

FOREIGN PATENT DOCUMENTS

| | | |
|---|---|---|
| DE | 92 05 102 | 7/1992 |
| EP | 0576 276 | 12/1993 |
| WO | WO 99/56101 | 11/1999 |

OTHER PUBLICATIONS

*Brochure*: "Water Budget Payment System", Schlumberger Industries, Measurement Division, salmon Road, Royton, Oldham, 1999–2000.
*Brochure*: "Affordable Water Management", Bambamanzi, New Germany, South Africa, 1999–2000.
*Brochure*: "Modulmeter, The modular plug–in meter concept", Andrae Leonberg, Germany, 1999–2000.

* cited by examiner

*Primary Examiner*—John Rivell
(74) *Attorney, Agent, or Firm*—Mark M. Friedman

(57) ABSTRACT

A water control device (10, 70) including a housing (12), including as one unit, an inlet port (14) and an exit port (16) for flow therethrough of water, and a water meter mounting flange (18) and a water flow control valve seat member (20) in fluid communication with each other and with at least one of the inlet and outlet ports, and a water meter (30) sealingly attached to the water meter mounting flange (18), and a water flow control valve (44) sealingly attached to the water flow control valve seat member (20).

16 Claims, 2 Drawing Sheets

WATER CONTROL DEVICE

FIELD OF THE INVENTION

The present invention relates generally to water control devices and particularly to a water control device comprising a housing integrally formed with a water meter and a water flow control valve, the water control device preferably forming part of a pre-paid water control system.

BACKGROUND OF THE INVENTION

Pre-paid water control systems are important water management systems, particularly in areas which lack infrastructure to monitor efficiently usage of water by residents. In a typical system, a consumer must pay ahead of time for water usage over a predetermined period of time, such as several months or a year. Once the consumer has paid, the local water authority or municipality provides the consumer with an identification medium, such as a smart card or coded key, for example. An interface unit, such as a card reader, is installed at the consumer site which reads the identification medium and interfaces with the municipality data base. After verifying the authenticity of the identification medium, water is supplied to the consumer for the predetermined period of time. China, Turkey and Russia are just some examples of countries where use of such pre-paid systems are becoming more prevalent.

A pre-paid water control unit generally comprises a standard water meter connected in line with a water flow valve. A card reader or other interface device is provided together with the unit. Such prior art units are commercially available from Schlumberger Industries, Measurement Division, Salmon Road, Royton, Oldham, Lancashire OL2 6BX, and from Bambamanzi, 14 Manchester Road, P.O. Box 2387, New Germany, South Africa.

SUMMARY OF THE INVENTION

The present invention seeks to provide a novel water control device wherein a water meter and water flow control valve are integrally formed in one unitary housing. The device of the present invention is preferably dimensioned to be the same size as present standard water meters so that the device can be readily installed in place of present meters without having to cut existing piping or install adapters.

It is a particular feature of the present invention that the device enables using a modular water meter which can be mounted and removed at will from the unitary housing without disturbing the other components of the water control device. This permits installation of water meters which already meet the requirements and codes of local municipalities or water authorities, without having to go through the time-consuming formalities of qualifying a new kind of meter. The present invention can be carried out with any kind of meter, such as a volumetric flow meter or flow velocity meter, and any kind of water control valve, such as a diaphragm valve or solenoid valve. The unitary construction of the housing realizes significant savings in manufacturing costs.

There is thus provided in accordance with a preferred embodiment of the present invention a water control device including a housing, including as one unit, an inlet port and an exit port for flow therethrough of water, and a water meter mounting flange and a water flow control valve seat member in fluid communication with each other and with at least one of the inlet and outlet ports, and a water meter sealingly attached to the water meter mounting flange, and a water flow control valve sealingly attached to the water flow control valve seat member.

In accordance with a preferred embodiment of the present invention the water meter includes a modular meter removably attachable to the water meter mounting flange.

Further in accordance with a preferred embodiment of the present invention a controller is provided which controls operation of at least one of the water meter and the water flow control valve.

Additionally in accordance with a preferred embodiment of the present invention the controller is part of a pre-payment water meter system.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
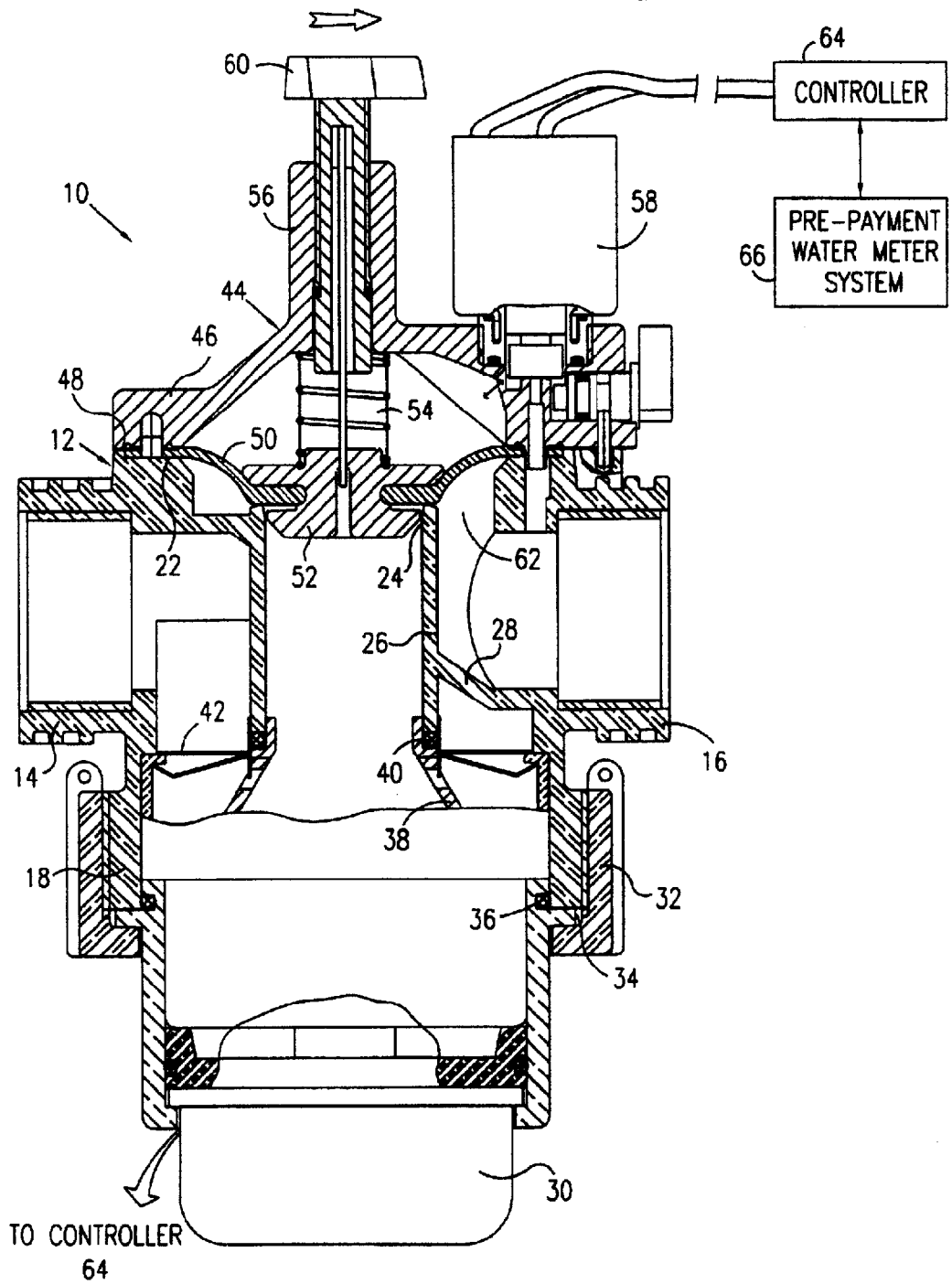
FIG. 1 is a simplified pictorial illustration of a water control device constructed and operative in accordance with a preferred embodiment of the present invention.

Reference is now made to FIG. 1 which illustrates a water control device 10 constructed and operative in accordance with a preferred embodiment of the present invention. Water control device 10 preferably includes a housing 12 which is formed with an inlet port 14 and an exit port 16. Inlet port 14 and exit port 16 are preferably configured for standard water tight connection to water supply piping. Extending from one side of ports 14 and 16 is a water meter mounting flange 18, and extending from an opposite side of the ports is a water flow control valve seat member 20. Flange 18 and valve seat member 20 are shown in FIG. 1 as having cylindrical shapes, but may be of any arbitrary shape. As illustrated in FIG. 1, valve seat member 20 has a lower profile than flange 18, but again any other configuration is also in the scope of the present invention. Housing 12, inlet port 14, exit port 16, flange 18 and valve seat member 20 are preferably formed as one unitary piece, such as by molding or casting.

Valve seat member 20 preferably includes an annular, machined mounting surface 22 and a central aperture 24, which, as described further hereinbelow, serve as a mounting surface and a sealing surface for a water control valve, respectively. Preferably extending from central aperture 24 is a channel 26 which extends into the center of flange 18 and fluidly connects valve seat member 20 and flange 18. A barrier 28 preferably extends from channel 26 to the junction between exit port 16 and flange 18. Barrier 28 prevents fluid communication between a water meter mounted on flange 18 and exit port 16. Preferably channel 26 and barrier 28 are integrally formed with the rest of housing 12. It is readily appreciated by those skilled in the art that alternatively barrier 28 can be located to prevent fluid communication between a water meter mounted on flange 18 and inlet port 14.

A water meter 30 is preferably sealingly attached to water meter mounting flange 18, such as by means of a collar band 32 which is tightened about a lip 34 of water meter 30 and secured around flange 18. An O-ring 36 at the base of meter 30 ensures a water tight connection. This is just one example of how to mount the water meter 30 to flange 18, and it is appreciated by persons skilled in the art that many other mounting arrangements are possible. Water meter 30 is shown in FIG. 1 to be a modular meter, such as a MOD-ULMETER brand water meter commercially available from Andrae Leonberg GmbH, Otto-Hahn-Strasse 25, D-68623 Lampertheim, Germany. A modular meter is a type of meter which can be "plugged in" to its mounting position, i.e., meter 30 can be removed and affixed to water meter mounting flange 18 as desired without disturbing the other components of water control device 10. In the illustrated embodiment, water meter 30 is a flow velocity water meter.

Preferably an internal flange 38 of water meter 30 is secured in water-tight fashion to channel 26 by means of an O-ring 40 which is part of an annular filter 42 secured to the base of water meter 30.

A water flow control valve 44 is preferably sealingly attached to water flow control valve seat member 20. Valve 44 can be any kind of commercially available or custom-built water control valve, such as the line of diaphragm control valves commercially available from Bermad Control Valves, Kibbutz Evron, Israel. Valve 44 preferably includes a housing 46 with a mounting face 48 from which centrally extends a diaphragm 50. Diaphragm 50 is connected to a stopper 52 of a plunger shaft 54 which is arranged for generally vertical movement in a rear hub 56 of housing 46. Stopper 52 and diaphragm 50 sealingly mate with central aperture 24 at an end of channel 26. Mounting face 48 is sealingly secured to mounting surface 22, with diaphragm 50 preferably serving as a seal thereat. A solenoid 58 is preferably provided for moving stopper 52 of shaft 54 and diaphragm 50 away from (i.e., to open valve 44) or towards (i.e., to close valve 44) central aperture 24. A manual turn-handle 60, preferably arranged in spring-loaded fashion with stopper 52, is provided for selectively closing valve 44.

In operation of water control device 10, water enters inlet port 14 and is preferably constrained to flow through filter 42 to water meter 30. The water flows from water meter 30 through channel 26 to stopper 52. When stopper 52 is lifted away from central aperture 24, water flows past central aperture 24 into the inner volume of housing 46 and then exits through an opening 62 formed in valve seat member 20 to exit port 16 and flows to the consumer.

In accordance with a preferred embodiment of the present invention, a controller 64 is in electrical communication (wired or wireless) with water meter 30 and/or water flow control valve 44, and controls their operation. Controller 64 may be part of a pre-payment water meter system 66, such as the Schlumberger system mentioned above, or any other commercially available or custom-built prepayment water meter system.

Figure 2:
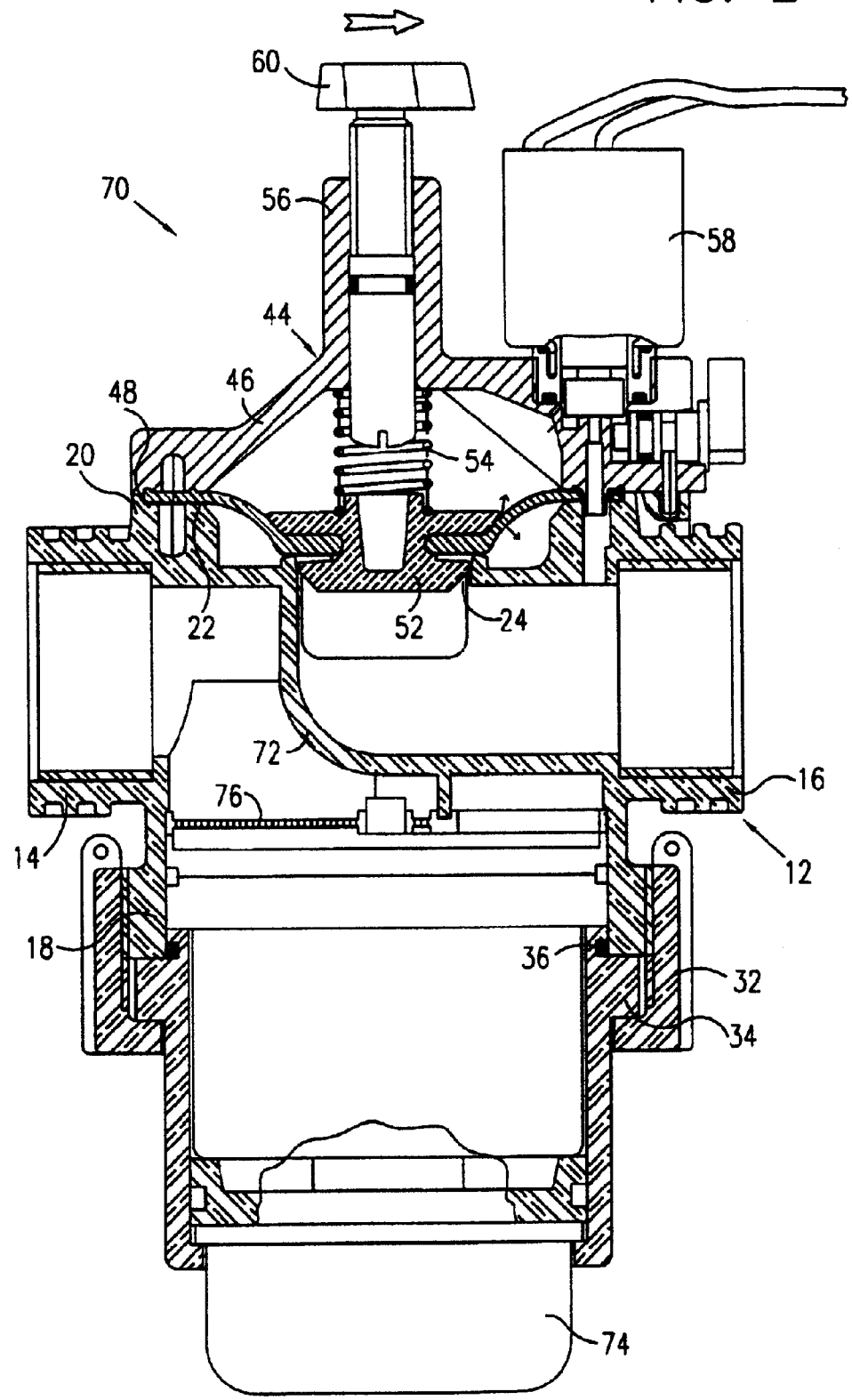
FIG. 2 is a simplified pictorial illustration of a water control device constructed and operative in accordance with another preferred embodiment of the present invention.

Reference is now made to FIG. 2 which illustrates a water control device 70 constructed and operative in accordance with a preferred embodiment of the present invention. Water control device 70 is preferably constructed similarly to water control device 10, with some exceptions described in the following paragraphs, with like elements being designated by like numerals.

Water control device 70 differs from water control device 10 in that water control device 70 does not comprise channel 26 and barrier 28. Instead, water control device 70 preferably includes an arcuate barrier 72 extending from central aperture 24 of valve seat member 20 to the junction between exit port 16 and flange 18. Barrier 72 prevents fluid communication between a water meter 74 mounted on flange 18 and exit port 16. Preferably barrier 72 is integrally formed with the rest of housing 12. Water meter 74 is preferably a volumetric flow water meter.

In operation of water control device 70, water enters inlet port 14 and is preferably constrained to flow through a filter 76 to water meter 74. The water flows from water meter 74 radially around the generally cylindrical portion of housing 12 extending between ports 14 and 16 to stopper 52. When stopper 52 is lifted away from central aperture 24, water flows past central aperture 24 into the inner volume of housing 46 and then exits through central aperture 24 to exit port 16 and flows to the consumer. It is appreciated by persons skilled in the art that FIGS. 1 and 2 illustrate just two examples of fluid communication between water meter 30 or 74 and valve 44 and many other structures can be provided in the scope of the present invention for effecting fluid communication therebetween.

It will be appreciated by persons skilled in the art that the present invention is not limited by what has been particularly shown and described hereinabove. Rather the scope of the present invention includes both combinations and sub-combinations of the features described hereinabove as well as modifications and variations thereof which would occur to a person of skill in the art upon reading the foregoing description and which are not in the prior art.

What is claimed is:

1. A water control device (10,70) characterized by:
   a housing (12) comprising as one unit:
     an inlet port (14) and an exit port (16) for flow therethrough of water, said inlet port and said exit port being substantially coaxial, and
     a water meter mounting flange (18) and a water flow control valve seat member (20) in fluid communication with each other and with at least one of said inlet and outlet ports (14,16);
   a water meter (30) scalingly attached to said water meter mounting flange (18);
   a water flow control valve (44) sealingly attached to said water flow control valve seat member (20); and
   a controller (64) which controls operation of at least one of said water meter (30) and said water flow control valve (44)
wherein said water flow control valve (44) and said water meter (30) are located on opposite sides of an axis of said inlet port (14) and said exit port (16).

2. The water control device (10,70) according to claim 1, wherein said water meter (30) comprises a modular meter removably attachable to said water meter mounting flange (18).

3. The water control device (10,70) according to claim 1, wherein said controller (64) is part of a pre-payment water meter system (66).

4. The water control device (10,70) according to claim 1, wherein said water meter (30) comprises a flow velocity water meter.

5. The water control device (10,70) according to claim 1, wherein said water meter (30) comprises a volumetric flow water meter (74).

6. The water control device (10,70) according to claim 1, wherein said water flow control valve (44) comprises a diaphragm control valve.

7. The water control device (10,70) according to claim 1, wherein said water flow control valve (44) is operable by a solenoid (58).

8. The water control device (10,70) according to claim 7, further comprising a solenoid (58) operatively connected to said water flow control valve (44).

9. A water control device (10,70) characterized by:

a housing (12) comprising as one unit:

an inlet port (14) and an exit port (16) for flow therethrough of water, said inlet port and said exit port being substantially coaxial, and a water meter mounting flange (18) and a water flow control valve seat member (20) in fluid communication with each other and with at least one of said inlet and outlet ports (14,16);

a water meter (30) sealingly attached to said water meter mounting flange (18);

a water flow control valve (44) sealingly attached to said water flow control valve seat member (20), wherein said water flow control valve (44) comprises a diaphragm control valve; and a controller (64) which controls operation of at least one of said water meter (30) and said water flow control valve (44).

10. The water control device (10,70) according to claim 9, wherein said water meter (30) comprises a modular meter removably attachable to said water meter mounting flange (18).

11. The water control device (10,70) according to claim 9, wherein said controller (64) is part of a pre-payment water meter system (66).

12. The water control device (10,70) according to claim 9, wherein said water meter (30) comprises a flow velocity water meter.

13. The water control device (10,70) according to claim 9, wherein said water meter (30) comprises a volumetric flow water meter (74).

14. The water control device (10,70) according to claim 9, wherein said water flow control valve (44) is operable by a solenoid (58).

15. The water control device (10,70) according to claim 14, further comprising a solenoid (58) operatively connected to said water flow control valve (44).

16. The water control device (10,70) according to claim 9, wherein said water flow control valve (44) and said water meter (30) are located on opposite sides of an axis of said inlet port (14) and said exit port (16).

* * * * *